(12) United States Patent
Tian et al.

(10) Patent No.: US 12,076,851 B2
(45) Date of Patent: Sep. 3, 2024

(54) CONTROL DEVICE FOR ADHESION AND DETACHMENT

(71) Applicant: TSINGHUA UNIVERSITY, Beijing (CN)

(72) Inventors: Yu Tian, Beijing (CN); Xiaosong Li, Beijing (CN); Hongyu Lu, Beijing (CN); Xinxin Li, Beijing (CN); Yonggang Meng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 773 days.

(21) Appl. No.: 17/204,952

(22) Filed: Mar. 18, 2021

(65) Prior Publication Data

US 2021/0197397 A1    Jul. 1, 2021

Related U.S. Application Data

(63) Continuation of application No. PCT/CN2019/114748, filed on Oct. 31, 2019.

(30) Foreign Application Priority Data

Aug. 15, 2019 (CN) .......................... 201910753426.7

(51) Int. Cl.
  *B25J 15/00*    (2006.01)
  *B25J 9/16*    (2006.01)
(52) U.S. Cl.
  CPC ........... *B25J 15/008* (2013.01); *B25J 9/1664* (2013.01)
(58) Field of Classification Search
  CPC .............................. B25J 15/008; B25J 9/1664
  See application file for complete search history.

(56) References Cited

U.S. PATENT DOCUMENTS

| 7,762,362 B2 | 7/2010 | Cutkosky et al. |
| 7,780,810 B2 * | 8/2010 | Hamano ................ G02C 5/126 156/247 |

(Continued)

FOREIGN PATENT DOCUMENTS

| CN | 101890988 A | 11/2010 |
| CN | 103617960 A | 3/2014 |

(Continued)

OTHER PUBLICATIONS

Yang Bin, "Research on Posture Control and Landing Collision of Space Gecko Robot", A Thesis in Navigation, guidance and control, for the degree of Master of Engineering, Nanjing University of Aeronautics and Astronautics, The Graduate School, College of Astronautics, Mar. 2017.

*Primary Examiner* — Stephen A Vu

(57) ABSTRACT

A control device for adhesion and detachment is provided and includes a base, an actuator, and a movement mechanism including a bearing unit, a peeling unit, and an adhesion unit. The peeling unit is a thin sheet with a high elastic modulus and has a first side and a second side that are opposite to each other. An upper surface of the peeling unit is fixed on a lower surface of the bearing unit. The actuator is fixed to the first side of the peeling unit. The adhesion unit is arranged on a lower surface of the peeling unit. The peeling unit bends and elastically deforms from the first side towards the second side under an action of the actuator in such a manner that the adhesion unit moves synchronously. The peeling unit is in a flat state upon a recovery from the elastic deformation.

12 Claims, 3 Drawing Sheets

(56) References Cited

U.S. PATENT DOCUMENTS

| | | | |
|---|---|---|---|
| 2007/0289786 A1 | 12/2007 | Cutkosky et al. | |
| 2014/0227473 A1* | 8/2014 | Parness | B25J 15/0052 |
| | | | 428/101 |
| 2016/0052144 A1* | 2/2016 | Spicer | B25J 15/008 |
| | | | 294/212 |
| 2020/0061844 A1* | 2/2020 | Jiang | B25J 15/008 |
| 2020/0338750 A1* | 10/2020 | Alizadehyazdi | H10N 30/87 |

FOREIGN PATENT DOCUMENTS

| | | |
|---|---|---|
| CN | 103847826 A | 6/2014 |
| CN | 103979030 A | 8/2014 |
| CN | 103847826 B | 7/2016 |
| CN | 106347513 A | 1/2017 |
| CN | 106379434 A | 2/2017 |
| CN | 106494652 A | 3/2017 |
| CN | 106379434 B | 6/2018 |
| CN | 108438080 A | 8/2018 |
| CN | 108501015 A | 9/2018 |
| CN | 106494652 B | 1/2019 |
| CN | 109756147 A | 5/2019 |
| TW | 200821023 A | 5/2008 |
| WO | 2008051289 A2 | 5/2008 |
| WO | 2008051289 A3 | 5/2008 |

* cited by examiner

CONTROL DEVICE FOR ADHESION AND DETACHMENT

CROSS-REFERENCE TO RELATED APPLICATION

The present application is a continuation of International Application No. PCT/CN2019/114748, filed on Oct. 31, 2019, which is filed based on and claims priority to Chinese patent Application No. 201910753426.7, filed on Aug. 15, 2019, the entire disclosure of which are hereby incorporated herein by reference.

TECHNICAL FIELD

The present disclosure relates to the field of mechanical structure and component technologies, and more particularly, to a control device for adhesion and detachment.

BACKGROUND

Active regulation of adhesion and friction can help components such as manipulators and robot feet of various advanced intelligent mechanical equipment complete operations such as grasping, assembling, docking, and movement between surfaces under different environmental conditions. Inspired by creatures such as geckos and beetles, researchers have revealed the mechanical mechanism of bionic adhesion and prepared, based on the mechanical mechanism, bionic adhesion surfaces with high-strength adhesion and friction properties. Compared with conventional grasping manners relying on mechanical pressure and friction, the bionic adhesion technology based on van der Waals force has advantages such as flexible contact, applicability in a vacuum environment, low stress concentration, no pollution, and simple control, and has a broad application prospect.

At present, controllable adhesion and detachment technologies, which respond based on physical field regulation of force, air pressure, temperature, light and the like, have been proposed for bionic dry adhesion surfaces. However, there are still problems such as low normal adhesion strength, small effective adhesion area, slow operation and high environmental requirements, thereby limiting practical applications of the controllable adhesion and detachment technologies in industrial production.

SUMMARY

The present disclosure aims to solve at least one of the technical problems in the related art. To this end, an objective of the present disclosure is to provide a control device for adhesion and detachment, which can perform fast, reliable, and stable high-strength adhesion and detachment control while being low in cost, simple in structure, and convenient to operate, and having good repeatability.

The control device for adhesion and detachment according to embodiments of the present disclosure includes:
  a base configured to be connected to a rear-end operating mechanism;
  an actuator, mounted on the base; and
  a movement mechanism, including a bearing unit, a peeling unit, and an adhesion unit,
  wherein the bearing unit is compressible but resistant to stretching, and an upper surface of the bearing unit is fixed on a lower surface of the base;
  the peeling unit is a thin sheet with a high elastic modulus and has a first side and a second side that are opposite to each other, an upper surface of the peeling unit is fixed on a lower surface of the bearing unit, and the actuator is arranged on and fixed to the first side of the peeling unit, or the actuator is arranged on and fixed to both the first side and the second side of the peeling unit; and
  the adhesion unit is arranged on a lower surface of the peeling unit; in a case where the actuator is arranged on the first side, when the peeling unit bends and elastically deforms from the first side towards the second side under an action of the actuator in such a manner that the peeling unit is pulled up, the adhesion unit is pulled up synchronously, or in a case where the actuator is arranged on both the first side and the second side, when the peeling unit bends and elastically deforms from the first side and the second side towards a middle part of the peeling unit under an action of the actuator in such a manner that the peeling unit is pulled up, the adhesion unit is pulled up synchronously; and the peeling unit is in a flat state upon a recovery from elastic deformation.

According to the control device for adhesion and detachment according to embodiments of the present disclosure, as an example, in the case where the actuator is arranged on the first side of the peeling unit, the operation process of the actuator will be described as follows. For adhesion, a posture of the control device for adhesion and detachment is aligned with a surface of an object and approaches the surface of the object until the adhesion unit is in contact with a surface of a flat object, such that a proper contact pressure is generated to form a good contact state between the adhesion unit and the surface of the flat object, thereby generating an enough adhesion force and thus achieving adhesion and grabbing. For detachment, the actuator is made to move upwards in such a manner that the peeling unit is pulled up while being bent, and compresses the bearing unit. Since the adhesion unit and the peeling unit move synchronously, the adhesion unit is peeled off from the surface of the flat object. As the control device for adhesion and detachment moves in a direction facing away from the surface of the object, detachment and releasing may be achieved. A minimum contact area, a maximum peeling angle and a minimum peeling stiffness between the adhesion unit and the surface of the object are achieved, and thus a relatively small adhesion force may be generated to achieve a purpose of releasing.

It should be noted that the operation principle of the actuator arranged on the first side and the second side of the peeling unit is the same as that of the actuator arranged on the first side of the peeling unit, except that when the first side and the second side of the peeling unit, under simultaneous actions of corresponding actuators, undergo the bending and elastic deformation from the first side and the second side towards the middle part of the peeling unit in such a manner that the peeling unit is pulled up, the adhesion unit is pulled up synchronously.

According to the control device for adhesion and detachment according to embodiments of the present disclosure, during adhesion, the base, the bearing unit, and the peeling unit may utilize an adhesion force of an adhesion surface of the entire adhesion unit to the greatest extent through a bearing effect, thereby achieving the high-strength adhesion. During detachment, the actuator drives the first side of the peeling unit to bend or drives the first side and the second side of the peeling unit to bend in such a manner that the bearing unit is compressed, and the adhesion unit and the peeling unit are simultaneously bent, which changes the contact area, the peeling angle and the peeling stiffness of an interface for adhesion to reduce the adhesion force, thereby achieving rapid and easy detachment and releasing. In addition, the control device for adhesion and detachment according to embodiments of the present disclosure has a low cost, a simple structure, and a good repeatability, and is easy to operate and suitable for industrial production and assembly line operations requiring high-strength and large-area adhesion and detachment.

According to some embodiments of the present disclosure, when the actuator is arranged on the first side of the peeling unit, the base is provided with a middle through hole that is vertical; the actuator passes through the middle through hole; and one or a plurality of movement mechanisms is provided, each of the one or the plurality of movement mechanisms is fixed to the lower surface of the base through the upper surface of the bearing unit, a first side of each of the one or the plurality of movement mechanisms is close to the middle through hole, and a second side of each of the one or the plurality of movement mechanisms is away from the middle through hole.

According to some embodiments of the present disclosure, one actuator is provided, and a lower end of the actuator is fixed to the first side of each of a plurality of peeling units.

According to some embodiments of the present disclosure, a plurality of actuators is provided, and the plurality of actuators is respectively fixed to the first side of each of a plurality of peeling units in a one-to-one correspondence.

According to some embodiments of the present disclosure, the actuator is one of a cable, a crank connecting rod, artificial muscle, and a dielectric elastomer.

According to some embodiments of the present disclosure, the control device further includes a tube body embedded in the middle through hole, and the actuator passes through the tube body.

According to some embodiments of the present disclosure, the tube body is made of polytetrafluoroethylene.

According to some embodiments of the present disclosure, the bearing unit is one of a foam member, a rubber member, a fiber body, and a spring member.

According to some embodiments of the present disclosure, the peeling unit is a spring steel sheet or a polymer sheet.

According to some embodiments of the present disclosure, the bearing unit is arranged between the upper surface of the peeling unit and the lower surface of the base and is close to the second side, and a space close to the first side is provided between the upper surface of the peeling unit and the lower surface of the base.

According to some embodiments of the present disclosure, the adhesion unit is an adhesion layer with a flat surface or an adhesion layer with an array of microstructures.

According to some embodiments of the present disclosure, an end of each of the microstructures is a disc-shaped thin plate or a funnel-shaped thin plate.

Additional aspects will be set forth in part in the description which follows and, in part, will be apparent from the description, or may be learned by practice of the presented embodiments.

BRIEF DESCRIPTION OF DRAWINGS

These and other aspects and advantages of embodiments of the present disclosure will become apparent and more readily appreciated from the following descriptions made with reference to the accompanying drawings, in which.

Figure 1:
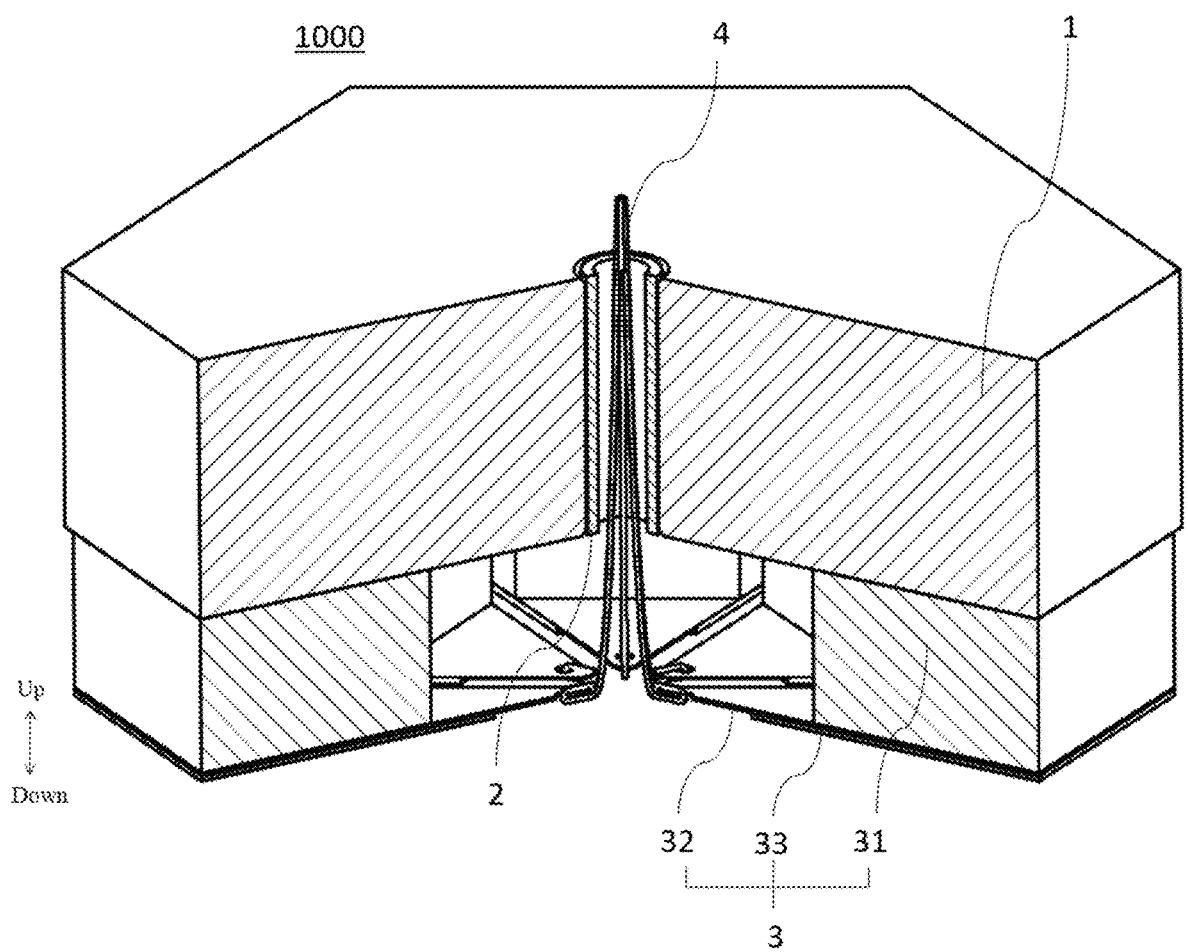
FIG. 1 is a schematic diagram of a control device for adhesion and detachment according to embodiments of the present disclosure.
Figure 2:
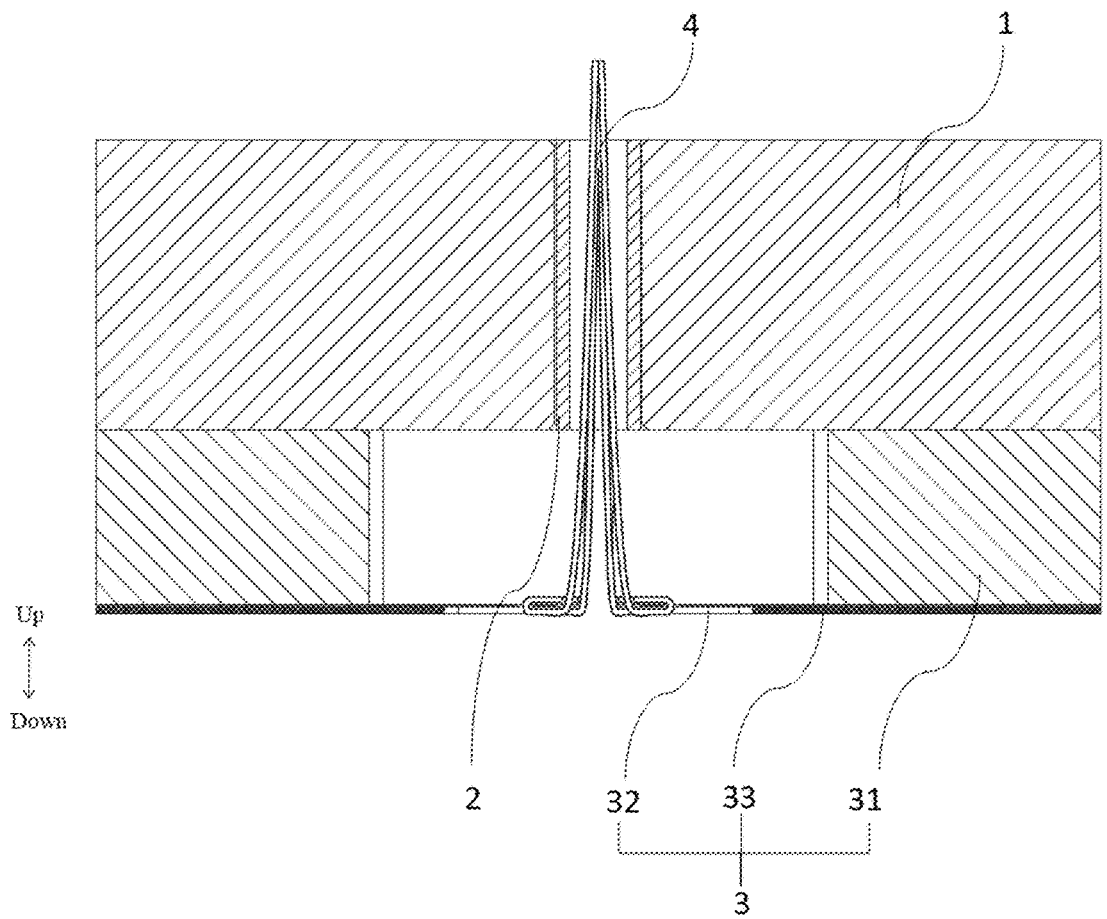
FIG. 2 is a cross-sectional view of a control device for adhesion and detachment according to embodiments of the present disclosure.
Figure 3:
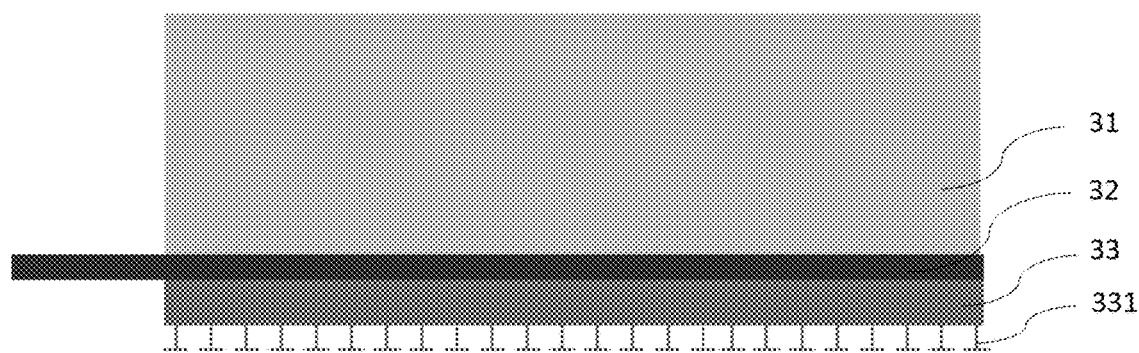
FIG. 3 is a schematic diagram illustrating a structure of a movement mechanism of a control device for adhesion and detachment according to embodiments of the present disclosure.

REFERENCE NUMERALS OF THE ACCOMPANYING DRAWINGS control device for adhesion and detachment 1000
base 1
tube body 2
movement mechanism 3, bearing unit 31, peeling unit 32, adhesion unit 33, microstructure 331
actuator 4

DESCRIPTION OF EMBODIMENTS

Descriptions will now be made in detail to embodiments, examples of which are illustrated in the accompanying drawings. The same or similar elements and the elements having same or similar functions are denoted by like reference numerals throughout the specification. The embodiments described herein with reference to the drawings are illustrative, and merely used to explain the present disclosure. The embodiments shall not be construed to limit the present disclosure.

A control device for adhesion and detachment 1000 according to embodiments of the present disclosure will be described below with reference to FIGS. 1 to 5.

As illustrated in FIGS. 1 to 5, the control device for adhesion and detachment 1000 according to embodiments of the present disclosure includes a base 1, an actuator 4, and a movement mechanism 3. The base 1 is configured to be connected to a rear-end operating mechanism. The actuator 4 is mounted on the base 1. The movement mechanism 3 includes a bearing unit 31, a peeling unit 32, and an adhesion unit 33. The bearing unit 31 is compressible but resistant to stretching. An upper surface of the bearing unit 31 is fixed on a lower surface of the base 1. The peeling unit 32 is a thin sheet with a high elastic modulus and has a first side and a second side that are opposite to each other. An upper surface of the peeling unit 32 is fixed on a lower surface of the bearing unit 31. The actuator 4 is arranged on and fixed to the first side of the peeling unit 32, or the actuator 4 is arranged on and fixed to both the first side and the second side of the peeling unit 32. The adhesion unit 33 is arranged on a lower surface of the peeling unit 32. In a case where the actuator 4 is arranged on the first side, when the peeling unit 32 bends and elastically deforms from the first side towards the second side under an action of the actuator 4 in such a manner that the peeling unit 32 is pulled up, the adhesion unit 33 is pulled up synchronously, or in a case where the actuator 4 is arranged on both the first side and the second side, when the peeling unit 32 bends and elastically deforms from the first side and the second side towards a middle part of the peeling unit 32 under the action of the actuator 4 in such a manner that the peeling unit 32 is pulled up, the adhesion unit 33 is pulled up synchronously. The peeling unit 32 is in a flat state upon a recovery from the elastic deformation.

Specifically, the base 1 is configured to be connected to the rear-end operating mechanism. For example, the base 1 may be connected to the rear-end operating mechanism through a threaded hole, a flange, or a hinge, so as to achieve a posture control of the control device 1000 for adhesion and detachment according to embodiments of the present disclosure.

The actuator 4 is mounted on the base 1, and the movement mechanism 3 connected to the actuator 4 may be driven by the rear-end operating mechanism to achieve detachment and release operations. Specifically, the actuator 4 may cause the peeling unit 32 and the adhesion unit 33 of the movement mechanism 3 to bend, in such a manner that an adhesion surface is peeled from a surface of a flat object.

The movement mechanism 3 includes the bearing unit 31, the peeling unit 32 and the adhesion unit 33. Specifically, the bearing unit 31 may be made of a single-phase or composite material, which may bear tensile and compressive loads and have a low compressive strength and a high tensile strength. The upper surface of the bearing unit 31 is fixed on the lower surface of the base 1. The peeling unit 32 may be a continuous or track-like thin sheet made of a material with a high elastic modulus. The peeling unit 32 has the first side and the second side that are opposite to each other. The upper surface of the peeling unit 32 is fixed on the lower surface of the bearing unit 31. The actuator 4 is arranged on and fixed to the first side of the peeling unit 32, or the actuator 4 is arranged on and fixed to both the first side and the second side of the peeling unit. The adhesion unit 33 is arranged on the lower surface of the peeling unit 32. In the case where the actuator 4 is arranged on the first side, when the peeling unit 32 bends and elastically deforms from the first side towards the second side under an action of the actuator 4 in such a manner that the peeling unit 32 is pulled up, the adhesion unit 33 is pulled up synchronously, or in the case where the actuator 4 is arranged on both the first side and the second side, when the peeling unit 32 bends and elastically deforms from the first side and the second side towards the middle part of the peeling unit 32 under the action of the actuator 4 in such a manner that the peeling unit 32 is pulled up, the adhesion unit 33 is pulled up synchronously. The peeling unit 32 is in the flat state upon the recovery from the elastic deformation.

It should be noted that the bearing unit 31 is compressible but has a certain tensile strength. An objective of compression is to cause the movement mechanism 3 to bend and peel off. An objective of having the certain tensile strength is to bear a normal adhesion force of the adhesion unit 33, so as to achieve a high adhesion strength. The peeling unit 32 has a relatively high elastic modulus or is resistant to stretching as having a relatively great rigidity in a plane, so that under the action of the actuator 4, the peeling unit 32 may produce a movement form of bending to make the adhesion unit 33 peel off from the surface of the flat object, thereby achieving an easy detachment. In addition, since the peeling unit 32 has the relatively high elastic modulus and certain rigidity, reusability of the peeling unit 32 is good. The adhesion unit 33 has a strong adhesion force. When the peeling unit 32 is in the flat state upon the recovery from the elastic deformation, the adhesion unit 33 is also in a flat state and has the largest adhesion area adhering to the flat object, and the adhesion force is strong, such that a firm adhesion and grasping of the flat object may be achieved.

Figure 4:
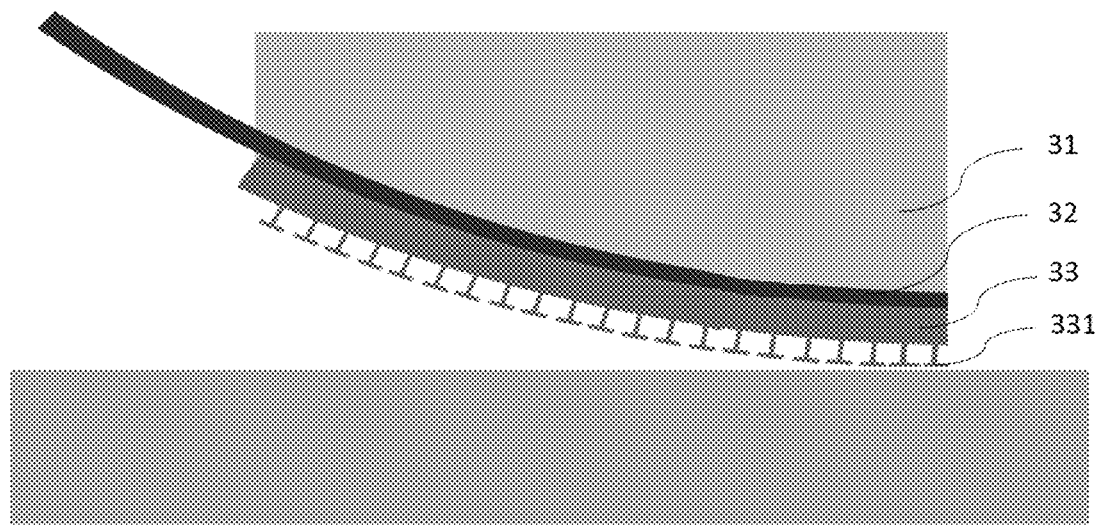
FIG. 4 is a schematic diagram illustrating a state in which a control device for adhesion and detachment detaches and releases a flat object according to embodiments of the present disclosure.
Figure 5:
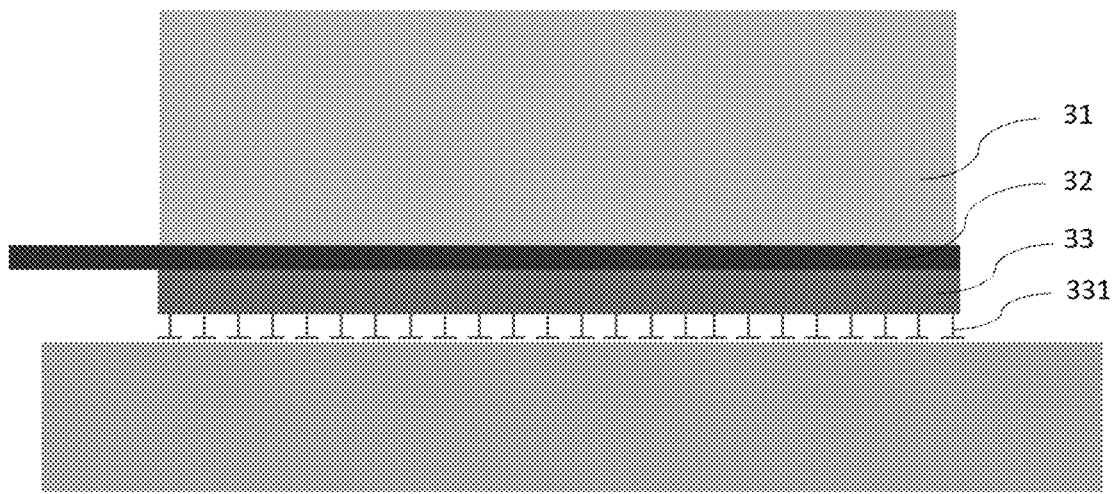
FIG. 5 is a schematic diagram illustrating a state in which a control device for adhesion and detachment adheres to and grasps a flat object according to embodiments of the present disclosure.

According to the control device 1000 for adhesion and detachment according to embodiments of the present disclosure, as an example, in the case where the actuator 4 is arranged on the first side of the peeling unit 32, an operation process of the actuator 4 will be described as follows. For adhesion (as illustrated in FIG. 5), a posture of the control device 1000 for adhesion and detachment is aligned with a surface of an object and approaches the surface of the object until the adhesion unit 33 is in contact with the surface of the flat object, such that a proper contact pressure is generated to form a good contact state between the adhesion unit 33 and the surface of the flat object, thereby generating an enough adhesion force and thus achieving adhesion and grabbing. For detachment (as illustrated in FIG. 4), the actuator 4 is made to move upwards in such a manner that the peeling unit 32 is pulled up while being bent, and compresses the bearing unit 31. Since the adhesion unit 33 and the peeling unit 32 move synchronously, the adhesion unit 33 is peeled off from the surface of the flat object. As the control device 1000 for adhesion and detachment moves in a direction facing away from the surface of the object, detachment and releasing may be achieved. As illustrated in FIG. 4, a minimum contact area, a maximum peeling angle and a minimum peeling stiffness between the adhesion unit 33 and the surface of the object are achieved, and thus a relatively small adhesion force may be generated to achieve a purpose of releasing.

It should be noted that the operation principle of the actuator 4 arranged on the first side and the second side of the peeling unit 32 is the same as that of the actuator 4 arranged on the first side of the peeling unit, except that when the first side and the second side of the peeling unit 32, under simultaneous actions of corresponding actuators 4, undergo the bending and elastic deformation from the first side and the second side towards the middle part of the peeling unit 32 in such a manner that the peeling unit 32 is pulled up, the adhesion unit 33 is pulled up synchronously.

According to the control device 1000 for adhesion and detachment according to embodiments of the present disclosure, during adhesion, the base 1, the bearing unit 31, and the peeling unit 32 may utilize an adhesion force of an adhesion surface of the entire adhesion unit 33 to the greatest extent through a bearing effect, thereby achieving the high-strength adhesion. During detachment, the actuator 4 drives the first side of the peeling unit 32 to bend or drives the first side and the second side of the peeling unit 32 to bend in such a manner that the bearing unit 31 is compressed, and the adhesion unit 33 and the peeling unit 32 are simultaneously bent, which changes the contact area, the peeling angle and the peeling stiffness of an interface for adhesion to reduce the adhesion force, thereby achieving rapid and easy detachment and releasing. In addition, the control device 1000 for adhesion and detachment according to embodiments of the present disclosure has a low cost, a simple structure, and a good repeatability, and is easy to operate and suitable for industrial production and assembly line operations requiring high-strength and large-area adhesion and detachment.

According to an embodiment of the present disclosure, the base 1 is provided with a middle through hole that is vertical. The actuator 4 passes through the middle through hole. A plurality of movement mechanisms 3 may be provided. Each movement mechanism 3 is fixed to the lower surface of the base 1 through the upper surface of the bearing unit 31. The first side of each movement mechanism 3 is close to the middle through hole, and the second side of each movement mechanism 3 is away from the middle through hole. It may be understood that, as a result, the structure is compact and, high-strength adhesion and rapid and easy detachment and releasing may be achieved.

It should be noted that in some embodiments, the control device 1000 for adhesion and detachment adopts a symmetrical or asymmetrical arrangement such as a circular, a rectangular, a triangular, a hexagonal or other polygonal, which may effectively increase a utilization rate of a structural area and reduce a number of the actuator 4, thereby facilitating compactness and light weight implementation of the structural design.

According to some embodiments of the present disclosure, one or multiple actuators 4 may be provided. When one actuator 4 is provided, a lower end of the actuator 4 is fixed to the first side of each of a plurality of peeling units 32. When a plurality of actuators 4 is provided, the plurality of actuators 4 is fixed to the first side of each of the plurality of peeling units 32 in a one-to-one correspondence. Consequently, the number of the actuator(s) 4 may be flexibly set according to actual needs.

According to some embodiments of the present disclosure, the actuator 4 is one of a cable, a crank connecting rod, artificial muscle, and a dielectric elastomer. When the actuator 4 is the cable, an upper end of the cable may be connected to a rear-end operating structure, and a lower end of the cable may be fixed to the first side of the peeling unit 32. For example, the first side of the peeling unit 32 may be provided with a perforated hole, a hook, a post or other structural forms to facilitate fixing of the lower end of the cable. During detachment, under an upward pulling force, the cable drives the first side of the peeling unit 32 to bend in such a manner that the bearing unit 31 is compressed, and the adhesion unit 33 and the peeling unit 32 are bent in synchronization, which changes the contact area, the peeling angle and the peeling stiffness of the interface for adhesion to reduce the adhesive force, thereby achieving rapid and easy detachment and releasing. During adhesion, the pulling force is released, and thus, the peeling unit 32 may be restored to the flat state due to its own elasticity, so that the adhesion unit 33 is also in the flat state and has the largest adhesion area adhering to the flat object, and the adhesion force is strong, such that a firm adhesion and grasping of the flat object may be achieved. When the actuator 4 is a crank connecting rod mechanism, a connecting rod of the crank mechanism may pass through the middle through hole, and a lower end of the connecting rod is movably connected to the first side of the peeling unit 32. Under driving of the crank mechanism, the connecting rod may move up and down. When the connecting rod is moving upward, the movement mechanism 3 may be quickly detached to release the flat object. The peeling unit 32 is reset when the connecting rod is moving down, and thus, the movement mechanism 3 may quickly adhere to and grasp the flat object. When the actuator 4 is the artificial muscle or the dielectric elastomer, both detachment and releasing and adhesion and grasping may be performed by driving the movement mechanism 3, and thus, repeated description is omitted here.

According to some embodiments of the present disclosure, a tube body 2 is further included. The tube body 2 is embedded in the middle through hole, and the actuator 4 passes through the tube body 2. Therefore, during the process of adhesion or detachment, the actuator 4 moving up and down in the tube body 2 may cause wear to an inner wall of the tube body 2 and the worn tube body 2 may be replaced.

According to some embodiments of the present disclosure, the tube body 2 is made of polytetrafluoroethylene. Therefore, the tube body 2 is wear-resistant and has a long service life. Of course, in other embodiments, the tube body 2 may also be made of other materials.

According to some embodiments of the present disclosure, the bearing unit 31 is one of a foam member, a rubber member, a fiber body, and a spring member. It may be understood that each of the foam member, the rubber member, a fiber member, and the spring member may meet functional requirements of the bearing unit 31. It should be noted that when the bearing unit 31 is the foam member, the rubber member or the fiber member, the foam member, the rubber member or the fiber member may be bonded and fixed on a lower surface of the base 1 by an adhesive, and the peeling unit 32 may also be bonded and fixed on a lower surface of the foam member, the rubber member or the fiber member by adhesive. When the bearing unit 31 is the spring member, an upper end and a lower end of the spring member may be fixed to the base 1 and the peeling unit 32, respectively, in other fixation manners. The adhesion unit 33 may be fixed on the lower surface of the peeling unit 32 by means of adhesive or bonding. In some other embodiments, the bearing unit 31, the peeling unit 32, and the adhesion unit 33 of the movement mechanism may be cast into one body using different composite materials.

According to some embodiments of the present disclosure, the peeling unit 32 is a spring steel sheet or a polymer sheet. It may be understood that both the spring steel sheet and the polymer sheet are thin sheets with a high elastic modulus, which may meet functional requirements of the peeling unit 32.

According to some embodiments of the present disclosure, the bearing unit 31 is arranged between the upper surface of the peeling unit 32 and the lower surface of the base 1, and is close to the second side. A space close to the first side is provided between the upper surface of the peeling unit 32 and the lower surface of the base 1. Therefore, during detachment, the peeling unit 32 may bend easier, which facilitates quick and easy detachment and releasing.

According to some embodiments of the present disclosure, the adhesion unit 33 is an adhesion layer with a flat surface or an adhesion layer with an array of microstructures 331. When the adhesion unit 33 is the adhesion layer with the flat surface, the adhesion layer with the flat surface may be a pressure-sensitive adhesive tape or a rubber film. When the adhesion unit 33 is the adhesion layer of the microstructures 331, the array of the microstructures 331 may adopt a bionic surface with adhesion performance, that is, a disc-shaped thin plate, a funnel-shaped thin plate, or other array structures that can enhance the adhesion performance may be provided at an end of the microstructure 331, thereby leading to the strong adhesion force.

Reference throughout this specification to a reference term such as "an embodiment", "some embodiments", "an illustrative embodiment", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. In addition, the described specific feature, structure, material or characteristic may be combined in any one or more embodiments or examples in a suitable manner.

Although embodiments of the present disclosure have been illustrated and described above, it should be understood by those skilled in the art that changes, alternatives, and modifications may be made to the embodiments without departing from spirit and principles of the present disclosure. The scope of the present disclosure is limited by the attached claims and its equivalents.

What is claimed is:

1. A control device for adhesion and detachment, comprising:
   a base configured to be connected to a rear-end operating mechanism;
   an actuator mounted on the base; and
   a movement mechanism comprising a bearing unit, a peeling unit, and an adhesion unit,
   wherein the bearing unit is compressible but resistant to stretching, and an upper surface of the bearing unit is fixed on a lower surface of the base;
   the peeling unit is a thin sheet with a high elastic modulus and has a first side and a second side that are opposite to each other, an upper surface of the peeling unit is fixed on a lower surface of the bearing unit, and the actuator is arranged on and fixed to the first side of the peeling unit, or the actuator is arranged on and fixed to both the first side and the second side of the peeling unit; and
   the adhesion unit is arranged on a lower surface of the peeling unit; in a case where the actuator is arranged on the first side, when the peeling unit bends and elastically deforms from the first side towards the second side under an action of the actuator in such a manner that the peeling unit is pulled up, the adhesion unit is pulled up synchronously, or in a case where the actuator is arranged on both the first side and the second side, when the peeling unit bends and elastically deforms from the first side and the second side towards a middle part of the peeling unit under an action of the actuator in such a manner that the peeling unit is pulled up, the adhesion unit is pulled up synchronously; and the peeling unit is in a flat state upon a recovery from elastic deformation.

2. The control device of claim 1, wherein when the actuator is arranged on the first side of the peeling unit, the base is provided with a middle through hole that is vertical; the actuator passes through the middle through hole; and one or a plurality of movement mechanisms is provided, each of the one or the plurality of movement mechanisms is fixed to the lower surface of the base through the upper surface of the bearing unit, a first side of each of the one or the plurality of movement mechanisms is close to the middle through hole, and a second side of each of the one or the plurality of movement mechanisms is away from the middle through hole.

3. The control device of claim 2, further comprising a tube body embedded in the middle through hole, the actuator passing through the tube body.

4. The control device of claim 3, wherein the tube body is made of polytetrafluoroethylene.

5. The control device of claim 1, wherein one actuator is provided, and a lower end of the actuator is fixed to the first side of each of a plurality of peeling units.

6. The control device of claim 1, wherein a plurality of actuators is provided, and the plurality of actuators is respectively fixed to the first side of each of a plurality of peeling units in a one-to-one correspondence.

7. The control device of claim 1, wherein the actuator is one of a cable, a crank connecting rod, artificial muscle, and a dielectric elastomer.

8. The control device of claim 1, wherein the bearing unit is one of a foam member, a rubber member, a fiber body, and a spring member.

9. The control device of claim 1, wherein the peeling unit is a spring steel sheet or a polymer sheet.

10. The control device of claim 1, wherein the bearing unit is arranged between the upper surface of the peeling unit and the lower surface of the base and is close to the second side, and a space close to the first side is provided between the upper surface of the peeling unit and the lower surface of the base.

11. The control device of claim 1, wherein the adhesion unit is an adhesion layer with a flat surface or an adhesion layer with an array of microstructures.

12. The control device of claim 11, wherein an end of each of the microstructures is a disc-shaped thin plate or a funnel-shaped thin plate.

* * * * *